UNITED STATES PATENT OFFICE.

WILLIAM J. BURKE, OF SCRANTON, PENNSYLVANIA.

COMPOSITION OF MATTER FOR PAVING, &c., AND PROCESS OF FORMING SAME.

SPECIFICATION forming part of Letters Patent No. 629,766, dated August 1, 1899.

Application filed February 24, 1898. Serial No. 671,530. (No specimens.)

*To all whom it may concern:*

Be it known that I, WILLIAM J. BURKE, a citizen of the United States of America, residing at Scranton, in the county of Lackawanna, in the State of Pennsylvania, have invented certain new and useful Improvements in Compositions of Matter for Paving and other Purposes and Processes of Forming the Same, of which the following is a specification.

The composition consists of the following ingredients, viz: impalpably-powdered anthracite coal, thirty-seven and one-half pounds; pitch, twenty-five pounds; dead-oil, twenty-five pounds, and resin twelve and one-half pounds.

The process of mixing the above ingredients is as follows: I first heat the powdered anthracite in an iron vessel having a loose cover for the egress of gas or vapor. The anthracite is heated to about 150° or 200° Fahrenheit, and the heat is kept up until the mass is evenly heated throughout. The pitch, dead-oil, and resin are placed in a suitable vessel and heated to boiling-point and stirred until thoroughly mixed. I then add the heated impalpably-powdered anthracite and stir the mass until it is thoroughly mixed, the heat being continued during such mixing, and the mass will be brought to a high boiling-point. The boiling will be continued until I find by testing that the composition is ready for running off into barrels or molds, where it will harden. A proper test will be to drop some of the composition on a cold surface, and when it hardens rapidly thereon it will be ready.

The above-described composition may now be remelted and used in filling the cracks between paving-blocks or bricks and for various other purposes.

Where the composition is to be used for making paving or building blocks, surfacing streets, or forming the bed of a roadway, &c., the proportion of anthracite dust is increased to about sixty or seventy pounds, and the other ingredients are reduced in proportion. The process of mixing is the same as that above described, and the heated mass, which is in a somewhat granular form, may be carried to the place of use and there applied as a surfacing for roadways, &c., by means of rollers, smoothing-irons, &c., after the manner of laying sheet-asphalt, or it may be compressed by suitable molds into blocks or articles for various uses.

The powdered anthracite used is the coal-dust or impalpable powder which accumulates in large quantities at coal crushing or breaking machines, and what I term "dead-oil" is otherwise known as "gas-tar."

The above-described filling composition will form when reheated a binder which will so firmly unite the bricks or paving-blocks that it will be very difficult to break them apart at the joint. At least I have so found it when used as a filling for vitrified bricks. The tensile strength of such filler or binder I found to be three hundred and sixty pounds, while the other form of the composition developed a tensile strength of six hundred and seventy pounds, and I find that both forms of the composition are not injuriously affected by frost or moisture or by any changes in atmospheric temperature, and, owing to the high degree of heat employed in manufacturing the compositions, they will withstand a great amount if subjected thereto.

A further advantage of the composition is its comparative cheapness, since the coal-dust and dead-oil or gas-tar are both waste products.

What I claim is—

1. The herein-described composition for paving and building purposes, consisting of impalpably-powdered anthracite coal for the base, and an oleaginous resinous binder therefor; in substantially the proportions stated, and thoroughly mixed together and united by heat.

2. The herein-described composition of matter, consisting, in coal-dust, pitch, dead-oil, and resin, in substantially the proportions stated; the same being thoroughly mixed together and united by heat, substantially as and for the purposes set forth.

3. The herein-described process of forming a composition for the purposes stated, consisting in heating coal-dust in a suitable receptacle, then melting together in a separate receptacle, pitch, dead-oil and resin, then adding the heated coal-dust to the melted mixture during the continuance of the heat and bringing the mass to the boiling-point, substantially as and for the purposes set forth.

4. The herein-described process of forming blocks for paving and building purposes, the same consisting in heating coal-dust in a suitable vessel, then melting together pitch, dead-oil, and resin in a second vessel or receptacle, then mixing therewith the heated coal-dust and bringing the mass to the boiling-point and finally molding the composition in suitable molds, substantially as and for the purpose set forth.

In testimony whereof I affix my signature in presence of two witnesses.

WILLIAM J. BURKE.

Witnesses:
SOLON C. KEMON,
GEO. H. EVANS.